Patented June 29, 1926.

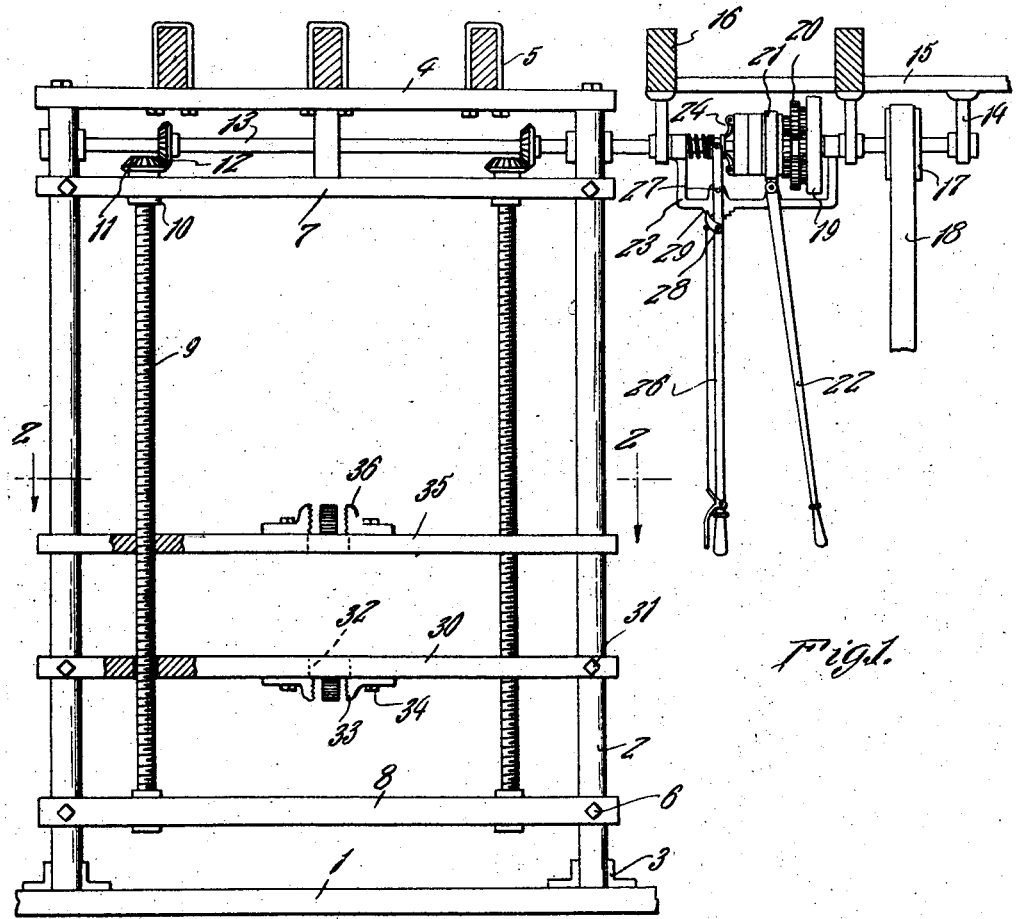
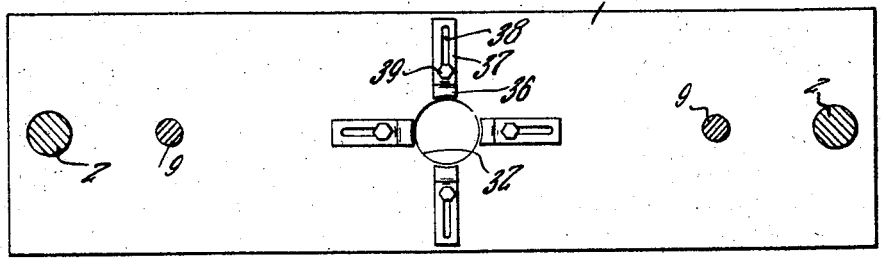

1,590,918

UNITED STATES PATENT OFFICE.

FRANCIS TINDELL, OF KNOXVILLE, TENNESSEE.

GEAR PULLER.

Application filed August 15, 1925. Serial No. 50,455.

The object of this invention is the provision of a strongly constructed, easily operated and controlled device which is primarily intended for pulling gears from shafts, but which, of course is susceptible to other uses.

A further object is the provision of an apparatus of this class, characterized by simplicity in construction and reliability and efficiency in practical use.

To the attainment of the foregoing the invention consists in the improvement as hereinafter described and definitely claimed.

In the drawings:—

Figure 1 is a side elevation of the improvement with parts in section.

Figure 2 is a sectional view on the line 2—2 of Figure 1.

On a foundation 1, of concrete or the like, I erect spaced standards 2. The lower ends of the standards are reinforced by suitable brackets 3 secured to both the standards and the base. The standards have their upper ends connected by a beam 4, although the standards are preferably round in cross section. The beam has connected thereto U-shaped hangers 5 that are arranged over the joists or other horizontal supports for the improvement.

Adjustably secured to the standards 2, by means 6, there are upper and lower plates 7 and 8, respectively. Both the standards and the plates 7 and 8 are preferably of metal, and the plates 7 and 8 are provided with aligning bearing openings for the ends of screw members 9, respectively. The screw members are freely revoluble in their bearings 10 but are held from longitudinal movement therethrough. The screws 9 have fixed on their ends above the plate or beam 7, gears 11, in mesh with similar gears 12 on a line shaft 13. The shaft is journaled in suitable bearings provided by the standards 2 and through other bearings 14 which depend from a support 15 secured to beams 16 which are in alignment with the beams that receive the hangers 5 therearound. On the shaft 13 between two of the bearings 14 there is a pulley wheel 17 for a belt 18. Also on the shaft there is a fly wheel 19. Associated with the fly wheel are the gears of a transmission means broadly indicated by the numeral 20. Around one of the transmission wheels there is a clutch band 21 which is operated by a lever 22 that is pivoted to a depending frame 23. By swinging the lever 22 the line shaft 13 will be caused to turn in a reverse direction to its ordinary course of turning, it being understood that the outer portion 24 of the line shaft is separated therefrom by the transmission assembly. The clutch which associates the line shaft with the drive shaft is spring influenced in the ordinary manner and is indicated by the numeral 25. This clutch is operated by a depending lever 26 which is pivoted, as at 27, to the frame 23. The lever carries a spring influenced handle operated dog 28 for engagement with the teeth of a segmental rack 29 on the frame 23.

The stationary lower jaw carrying plate of the improvement is indicated by the numeral 30. The screw members 9 pass freely through openings in the plate 30 and the uprights 2 also pass through openings in the said frame. The plate 30, while normally stationary is held adjusted on the standards 2 by means 31. The plate is provided with a central round opening 32 and on its under face with jaws 33 which are held adjustable with respect to themselves and to the openings 32, by means 34. The traveling plate of the improvement is indicated by the numeral 35. When this plate is constructed of metal it has threaded openings therethrough for the screws 9 and non-threaded openings for the guide standards 2. However, whether the plate is constructed of metal or not it may be provided with threaded bearings for the screws 9. The plate 35 is provided with a round opening in a line with the opening 32 and adjustable on the top of the plate 35 with respect to each other, and of course with respect to the opening, there are jaws 36. These jaws are constructed similar to the jaws 33, the same having their active faces toothed and their lower portions formed with angle extensions 37 which are slotted longitudinally, as at 38. Passing through the slots and binding on the portions 37 of the jaws are the heads 39 of adjustable elements.

When the device is employed as a gear puller the shaft is inserted through openings in the traveler 35 and in the stationary plate 30. The clamping means 33 are adjusted to firmly grip the shaft, while the gear on the shaft rests on the clamping elements 36 on the traveler 35. The lever 26 is operated to connect the drive shaft 24 with the line shaft 13, so that the screws 9 are turned to cause the traveler 35 to move upwardly thereon. In this manner it will be noted that the gear may be easily and quickly pulled off of the shaft. By swinging the lever 22 to compress the band 21 the drive shaft 24 travels in the same direction, but the transmission imparts a reverse travel to the line shaft 13 and consequently causes the screws 9 to turn in an opposite direction. This moves the traveler 35 downwardly on the device.

By arranging the plate 30 adjustably on the standards, shafts of varying lengths may be properly gripped therebtween. Of course, the operation above described may be reversed so that the shaft may be gripped by the jaws 36 on the traveler 35 and it will be apparent that the improvement is not only successful in its employment as a gear puller but may be successfully employed as a press for forcing material between the plates 35 and 30 and for various other useful purposes.

Having described the invention, I claim:—

1. In a device for the purpose set forth, a base, guide standards arising therefrom and secured thereto, upper supports for the standards, guide bars adjustably secured to the standards, screws freely journaled in bearings in said bars but held from longitudinal movement therethrough, gears on the upper ends of the screws, a line shaft having gears in mesh with the first mentioned gears, spaced plates guided on the standards, one of which freely receives the screws therethorugh and is adjustably secured to the standards, the other having threaded openings for engagement by the threads of the screws, both of said plates having aligning openings therethrough, jaws arranged in adjustable series opposite said openings, a drive shaft, and transmission means for hitching the drive shaft to the line shaft to cause the line shaft to travel with the drive shaft or to reverse the turning of the line shaft with respect to the drive shaft.

2. In a device for the purpose set forth, a fixed frame comprising spaced standards, upper and lower securing means for the frame, upper and lower spacing members for the standards, adjustably secured thereon, spaced screws journaled through the spacing members, but held from longitudinal movement therefrom, a plate on the standards adjustably secured thereto and having openings through which the screws freely pass, said plate having an opening therein, jaws on the plate adjustable with respect to said opening, a second plate comprising a follower which is guided on the standards and which has threaded openings engaged by the screws, said second plate having an opening therethrough aligning with that of the first mentioned plate, adjustable jaws on the second plate opposite the opening therein, gears on the upper ends of the screws, a line shaft journaled in bearings on the frame and having gears in mesh with the first mentioned gears, a drive shaft, a transmission connection between the drive and the line shaft, a supporting frame having its ends providing bearings for the line shaft and for the drive shaft and in which the transmission means is secured, and lever operated means pivotally secured to the frame and associated with the reverse and with the clutch members of the transmission means for locking the line shaft for movement in the same direction as the drive shaft or for causing the line shaft to turn in a reverse direction from that of the drive shaft.

In testimony whereof I affix my signature.

FRANCIS TINDELL.